(12) United States Patent
Flanders

(10) Patent No.: US 7,504,961 B2
(45) Date of Patent: Mar. 17, 2009

(54) EMERGENCY ISOLATION VALVE CONTROLLER WITH INTEGRAL FAULT INDICATOR

(75) Inventor: Patrick S. Flanders, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 85 days.

(21) Appl. No.: 11/095,416

(22) Filed: Mar. 31, 2005

(65) Prior Publication Data

US 2006/0220844 A1    Oct. 5, 2006

(51) Int. Cl.
*G08B 21/00*    (2006.01)

(52) U.S. Cl. ............... 340/679; 73/168; 73/862.32; 137/551; 137/552; 137/487.5; 137/624.12; 340/605

(58) Field of Classification Search ............... 340/540, 340/679, 604, 605; 702/51, 100; 137/551, 137/559, 486, 487.5, 624.12, 552, 14, 624.15; 73/168, 862.32

See application file for complete search history.

(56) References Cited

U.S. PATENT DOCUMENTS

| | | |
|---|---|---|
| 302,908 A | 8/1884 | Buell |
| 4,976,144 A | 12/1990 | Fitzgerald |
| 5,056,092 A | 10/1991 | Bruner |
| 5,197,328 A | 3/1993 | Fitzgerald |
| 5,329,465 A | 7/1994 | Arcella et al. |
| 5,425,316 A | 6/1995 | Malone |
| 5,573,032 A | 11/1996 | Lenz et al. |
| 5,586,050 A | 12/1996 | Makel et al. |
| 5,616,829 A * | 4/1997 | Balaschak et al. ............... 73/46 |
| 5,646,600 A * | 7/1997 | Abdel-Malek et al. ...... 340/679 |
| 5,684,451 A | 11/1997 | Seberger et al. |
| 6,057,771 A * | 5/2000 | Lakra ......................... 340/611 |
| 6,089,269 A | 7/2000 | Essam |
| 6,131,609 A | 10/2000 | Metso et al. |
| 6,176,247 B1 | 1/2001 | Winchcomb et al. |
| 6,186,167 B1 | 2/2001 | Grumstrup et al. |
| 6,283,138 B1 | 9/2001 | Friend et al. |
| 6,304,934 B1 * | 10/2001 | Pimenta et al. ............. 710/305 |
| 6,435,022 B1 | 8/2002 | Albuaijan |
| 6,631,882 B2 | 10/2003 | Mack |
| 6,678,584 B2 | 1/2004 | Junk et al. |
| 6,862,547 B2 | 3/2005 | Snowbarger et al. |
| 7,079,021 B2 * | 7/2006 | Snowbarger et al. ........ 340/514 |
| 2002/0069916 A1 * | 6/2002 | Ferguson et al. ......... 137/487.5 |
| 2002/0108436 A1 | 8/2002 | Albuaijan |
| 2003/0034469 A1 * | 2/2003 | Mack .................... 251/129.04 |
| 2004/0199351 A1 * | 10/2004 | Ott et al. ..................... 702/108 |

\* cited by examiner

*Primary Examiner*—Brent Swarthout
(74) *Attorney, Agent, or Firm*—Abelman, Frayne & Schwab

(57) ABSTRACT

A local logic solver operates with a local smart valve controller to control and test a local field-mounted emergency isolation valve device, outputting a local indication of trouble on the device, which is mounted in the field away from the facility's central control panel for the process. Accordingly, the operation of the overall system is simplified by eliminating the need for an external computer to diagnose any problems. A local control panel includes an indicator light substantially adjacent to or in close proximity to the device being monitored to alert personnel of detected faults. Detected faults are time-stamped locally to generate documentation and to track the elapsed time, starting when the degraded state of the device was detected and first signaled as a problem.

4 Claims, 4 Drawing Sheets

EMERGENCY ISOLATION VALVE CONTROLLER WITH INTEGRAL FAULT INDICATOR

FIELD OF THE INVENTION

This invention relates to valve controllers, and in particular to a smart valve controller with integrated fault indicators for emergency isolation valves (EIV).

BACKGROUND OF THE INVENTION

As used herein, the term smart valve means a computer-controlled valve with a locally disposed microprocessor or chip programmed for adaptively responding to changing conditions. Known smart valve systems and remote safety logic solvers can be configured to be connected to a central monitoring computer system; however, such a configuration for use in a chemical or petroleum processing facility incurs significant overhead costs due to the requirement for communication links among the distributed mechanisms, such as safety devices. Those overhead costs are compounded since these smart valve systems and remote safety logic solvers are separate entities, but both are used for EIV control.

Prior art smart valve systems include an integrated assembly of an EIV, an actuator, a solenoid valve, a smart valve controller, a local control panel, and a plant-wide Emergency Shutdown (ESD) system. Each smart valve system uses the smart valve controller to control the travel of the EIV during routine functional testing, but relies heavily on the hard-wired input/output channels of a plant-wide ESD system for the logic required to provide local control through local control panels of individual smart valve devices and EIVs in the field.

Although some degree of local control of a safety instrumented function is provided by prior art systems, the implementation of local control throughout a plant-wide ESD system have been found to be very costly.

Prior art implementations of a set of local control actions for each EIV to complete safety instrumented functions for each specific application have also been found to be costly.

A need exists for integration of the logic required to perform local controls involved with a safety-instrumented function for each EIV in a smart valve controller to reduce the overall ESD input/output (I/O) requirements and to provide a significant cost savings, while implementing enhanced fault monitoring and detection.

Many systems are available in the prior art which monitor devices in the field and which provide diagnostic alarms upon detection of problems of such field-based devices. However, the such known systems require auxiliary computers to provide desired monitoring and diagnostic functionality. In addition, operators or maintenance technicians must use a stand-alone computer with special diagnostic software to interpret the data collected during an EIV function test and the associated test diagnostics.

Further, safety valve products of the prior art provide diagnostics remotely, but such products that are currently available for use in commercial processes and control systems do not include a local indicator mounted on the devices in the field, for performing such monitoring and diagnostic functions.

A need therefore exists for a device which simplifies operations for process plant operators and maintenance personnel by monitoring EIVs and their associated EIV control systems internally, as well as providing a local indicator to signal the existence of a detected problem when the problem is detected.

One drawback of known monitoring systems of the prior art is the overload of alarms; that is, the activation of too many alarms associated with numerous monitoring devices monitoring a large system or processing facility create personnel alert fatigue, which can pose a significant problem when a few serious hazardous conditions that produce alert or warning indications and alarms are scattered among other alert indications of less serious problems.

A need exists for a simple indicator to personnel of problems in a process system, such as an EIV, or a facility that personnel can readily recognize or identify as serious in order to take immediate action.

Known safety products and devices for monitoring faults can track the occurrence of faults, but none provide a running clock which track faults locally at the safety device. Accordingly, the lack of the ability to recognize and time-stamp faults reduces the accuracy of the tracking of faults.

A need exists for a locally positioned clock which tracks detected faults.

Known monitoring and detection systems provide limited alarm and warning capabilities. For example, U.S. Pat. No. 302,980 to Buell describes a fire extinguisher and alarm system using both local and remote central station alarm indications, but does not utilize or test EIVs using smart valve controllers.

U.S. Pat. Nos. 4,976,144 and 5,197,328 to Fitzgerald describe a diagnostic controller for testing and determining the operating condition of a pneumatically operated valve. However, the diagnostic controllers in Fitzgerald stroke a valve fully and thereby interrupt normal operations. The diagnostic controller also requires a portable external computer to be connected to pneumatic lines to collect data during testing.

U.S. Pat. No. 5,329,465 to Arcella et al. describes an on-line valve monitoring system which relies on a remotely located expert system to analyze valve data and to track and find trends in the historical data, but does not disclose a local diagnostic and indicator system.

U.S. Pat. No. 5,425,316 to Malone describes a control system used in a waste disposal system which has sensors for measuring conditions throughout the waste disposal system in order to improve the efficiency of waste incineration combustion chambers, as opposed to testing EIVs.

U.S. Pat. No. 5,573,032 to Lenz et al. describes a valve positioner with pressure feedback and other diagnostic functions, but the valve positioner lacks internal diagnostics and so there cannot be any local indication of detected faults.

U.S. Pat. No. 5,586,050 to Makel et al. describes a remotely controllable management system for a liquefied natural gas (LNG) station using both local and remote central station alarm indications. However, the management system relies on a remotely located host computer for emergency warnings and shut-down features. The management system does not describe EIVs and does not provide local fault indications based on internal diagnostics.

U.S. Pat. No. 5,684,451 to Seberger et al. describes a control system for digital communications with an instrument to perform diagnostic operations for use with an electro-pneumatic valve positioner, but does not suggest providing safety-related EIV on-board diagnostics and a local indicator for warning of detected failures.

U.S. Pat. No. 6,089,269 to Essam describes an emergency valve connected to a partial stroke controller to perform a partial stroke test at a predetermined time, but fails to provide any on-board diagnostics and any local indicator for detected failures.

U.S. Pat. No. 6,131,609 to Metso et al. describes a method and apparatus for surveying the condition of a control valve using on-board sensors, with diagnostics programmed into a digital positioner of the control valve. However, when faults are detected, such detection is communicated to a remote control system in a monitoring room in a separate control building, as opposed to providing a local indication warning of the detection of the faults.

U.S. Pat. No. 6,176,247 B1 to Winchcomb et al. describes a device for verifying the workability of a safety device, using on-board diagnostics of a safety related final element such as an EIV, and detected faults are communicated to a Remote Communications Interface (RCI), as distinguished from providing the local indication of a fault.

U.S. Pat. No. 6,283,138 B1 to Friend et al. describes a pressure relief valve monitoring device using both local and remote central station alarm indications to detect faults in pressure relief valves, as opposed to EIVs.

U.S. Pat. No. 6,435,022 B1 to Albuaijan, describes a partial stroke testing system using a limit switch invention to control the travel of a valve during on-line testing, but lacks on-board diagnostics and local indication of detected failures.

U.S. Pat. No. 6,631,882 B2 to Mack describes a testing apparatus to test a shutdown device during operation of a process, but requires use of a remotely located programmable logic controller to perform the testing and alarm functions on detection of test failure conditions. No on-board self-diagnostics are provided and there is no local indication of a detected fault.

U.S. Pat. No. 6,678,584 to Junk et al. describes a method and apparatus for performing diagnostics in a pneumatic control loop for a control valve, but lacks any provision of a local indication of detected dangerous faults.

BRIEF SUMMARY OF THE INVENTION

The present invention comprehends an emergency isolation valve controller with an integral function indicator which is locally positioned substantially adjacent to the safety devices, such as an EIV, to provide on-board diagnostics and local indications of detected faults, and to provide improved performance in monitoring and detecting faults in a chemical processing or other facility.

The present invention extends the capabilities of smart valve controllers to incorporate logic and local interface capabilities required to perform a safety instrumented function associated with an emergency isolation valve within the smart valve controller. The use of the present invention reduces the complexity of the plant-wide emergency shutdown system I/O connections required for each smart valve.

The present invention includes a local logic solver operating with a local smart valve controller to control and test a local field-mounted emergency isolation (or interrupt) valve (EIV) device that provides a local indication of trouble on the device, in the field. Accordingly, the operation of the overall system is simpler, in that there is no longer a need to use an external computer to diagnose the problem. In addition, technicians and operators in the field are alerted to a serious problem locally so that they can promptly take any necessary safety precautions, and/or undertake other appropriate action, including notifying a specialist to further diagnose the problem.

In addition, the present invention provides an indicator light which has a steady ON state when the valve being monitored is functioning properly during normal operations, and which changes to a flashing state when a fault is detected by internal diagnostics onboard the device itself. In addition, when the normally steady ON indicator light is in a steady OFF state, the illumination device, such as a lamp of the indicator light, has either burned out or the device being monitored is out of service.

By providing steady ON, flashing, or steady OFF states in close proximity, e.g., substantially adjacent to the device being monitored, the condition of the device can easily be determined when operators or maintenance personnel are performing routine visual checks. Accordingly, the operating state of the indicator light of the present invention alerts the responsible operators, safety inspectors and other personnel when a particular device is operating in a seriously degraded state.

Further, the present invention alerts plant personnel to major problems on EIVs installed as part of critical safety control systems. Such major problems include defects and faults which would disable an EIV from performing its safety function, such as a Valve Stuck condition, a Shaft Broken condition, and a condition in which damage to actuator internals of the EIV would prevent the EIV from moving to a pre-determined fail-safe state. Only when such major problems occur will a common trouble indicator light be activated.

The present invention can be applied to other monitoring devices, such as smart solenoid valves which monitor different types of internal failures, including a significant differential pressure across valve ports, and activating coil temperatures or current.

The present invention monitors and indicates only dangerous, normally undetected failures which would disable the intended safety functions of the device, where the monitoring function and the indicator signal(s) are of the device provided to personnel in the field at the location of the device.

In addition, the present invention is useful for tracking faults and for verifying safety system performance. Since a plant process or other production system must have its safety systems checked and maintained routinely to ensure their proper functioning at the required level of performance, for example, in accordance with the original plant safety guidelines, the present invention serves to provide the required documentation of system performance. When a dangerous fault in a safety device is detected, an internal systems clock registers or records data corresponding to the time that the fault is detected, and this so-called time stamping will continue until the fault is corrected. In this way, the time that the safety device was operating in a disabled state can be tracked and documented so that the impact on the overall safety instrumentation system performance can be more accurately evaluated. Furthermore, the running clock and time-stamping feature of the present invention is performed locally at the device being monitored.

As will be understood by those of ordinary skill in the art, the particular type of diagnostic system that can be utilized to activate the common fault indicator is not limited to the specific examples and functions described above. The method and system of the invention can be applied to such new systems as may be developed in the future.

BRIEF DESCRIPTION OF THE DRAWINGS

Preferred embodiments of the invention are further described below with reference to the drawings wherein.

DETAILED DESCRIPTION OF THE INVENTION

As illustrated in FIGS. 1-4, the present invention is directed to a system and method for managing plant process risk which include enhanced function indicators, and logic and local interface capabilities in a valve controller, associated with an EIV installed to perform a specific safety instrumented functions (SIF) with an emergency isolation valve (EUV) located in the smart valve controller itself. The advantages of the invention include the reduction of the footprint or size of the plant-wide ESD system through reduced I/O and improved diagnostic coverage of each EIV as final elements is increased through improved testing features and enhanced communications.

The smart valve controller can be implemented in a known manner, for example, to provide the apparatus described in U.S. Pat. No. 6,186,167 and U.S. application Ser. No. 10/116,940, filed Apr. 5, 2002, the disclosures of each of which is incorporated herein by reference in its entirety.

Implementation of the integrated fault indicator and smart controller of the invention reduces the complexity of the plant-wide emergency shutdown system I/O required for each smart valve device, including devices such as digital valve controllers with emergency shutdown (ESD) valves. The present invention takes advantage of the emerging Foundation Fieldbus for Safety Instrumented Systems (FF-SIS) communications protocol to increase the flow of diagnostic information from the field device to the plant-wide ESD system, as well as providing a secure communications link to allow the final elements or EIVs to communicate directly with the ESD host system.

Figure 1:
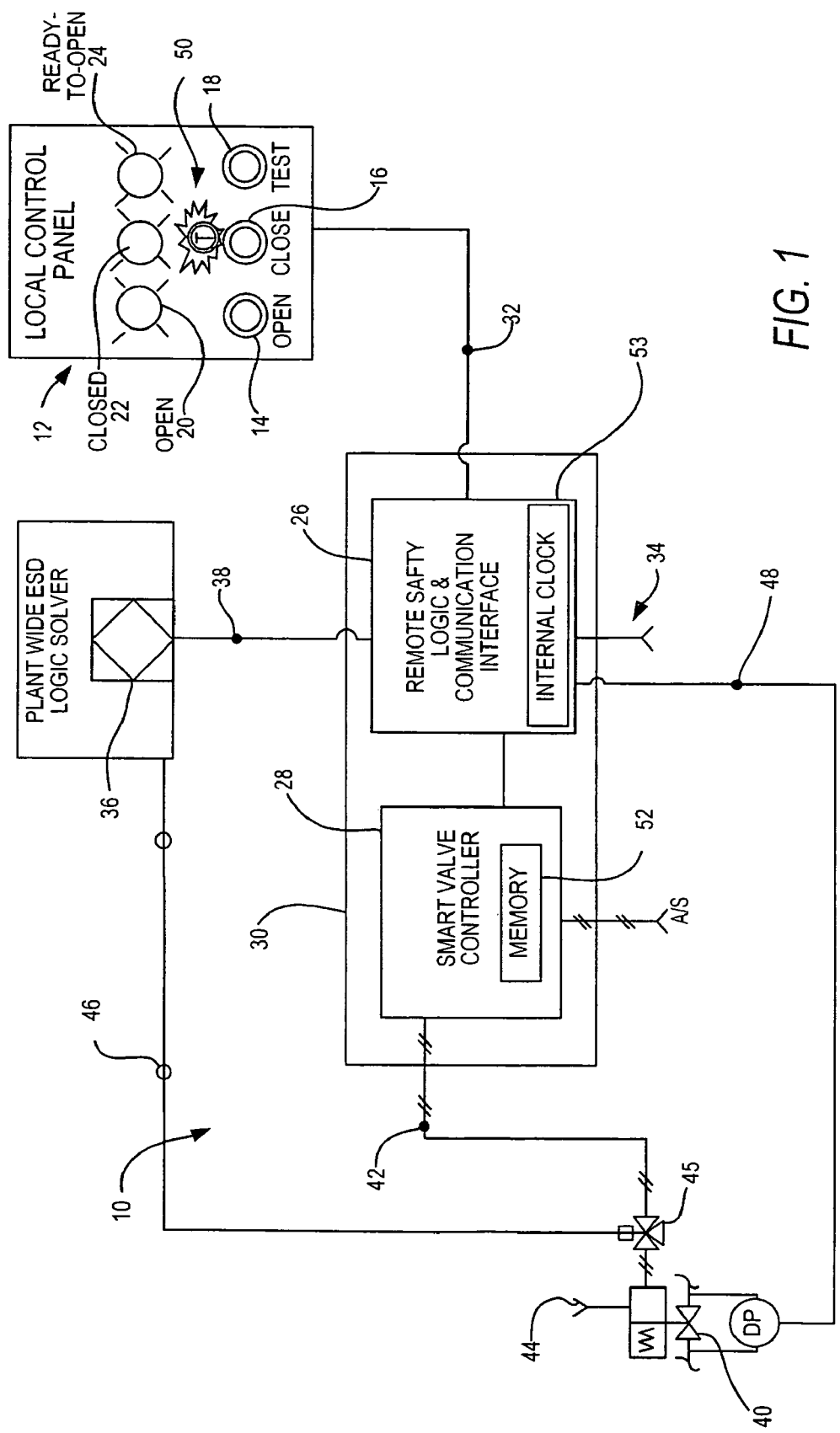
FIG. 1 illustrates a schematic block diagram of the system in accordance with the present invention.

As shown FIG. 1, the system 10 of the present invention provides a local control panel (LCP) 12 which houses a plurality of controls, such as a VALVE OPEN pushbutton 14, a VALVE CLOSE pushbutton 16, a VALVE TEST pushbutton 18, a VALVE OPEN indicator light 20, a VALVE CLOSE indicator light 22, and a READY-TO-OPEN indicator light 24. In the present invention, the LCP 12 directly interfaces with a local logic solver 26 connected to a smart valve controller 28 housed in an integrated valve controller and local logic solver assembly 30. It is entirely possible that the local logic solver (26) could be housed within the LCP (12). We want to allow for this flexibility. The local logic solver 26 can include a combination of remote safety logic and a communication interface with the remote safety logic being remote relative to a plant control center. The LCP 12 is locally positioned substantially adjacent to the local logic solver 26 and connected by a transmission channel 32, such as a wired and/or wireless connection, for conveying discrete signals required for local control and testing.

The local logic solver 26 is provided with power from a power supply 34, such alternatively, the power can be supplied through the communications link 38 as a 24 VDC supply, which is preferably independent of the plant-wide power grid. The local logic solver 26 can be connected to the plant-wide ESD logic solver 36 by a communications link 38, preferably in compliance with the FF-SIS communications protocol standard to provide global ESD plant-wide trips and permissives to the local logic solver 26.

Instead of relying on a plant-wide ESD system and its logic solver 36 as in the prior art to direct these local control functions, the integrated valve controller and local logic solver assembly 30 of the invention serves as a local safety instrumented function logic solver for a specific EIV 40 to which the local logic solver 26 in the integrated valve controller and local logic solver assembly 30 is locally mounted and operatively connected.

The integrated valve controller and local logic solver assembly 30 has a controller pneumatic output 42 operatively connected to the EIV actuator 44 of the EIV 40. A discrete output 46 sourced from the plant-wide ESD logic solver (36) can be used in conjunction with a conventional electro-pneumatic Solenoid valve to provide one-out-of-two voted fail-safe architecture with a smart valve positioner. The differential pressure (DP) transmitter permissive 48 is monitored remotely by the local login solver (26) and prevents opening the EIV 40 until pressure across the EIV 40 has been equalized. This measurement can also be used to diagnose valve seat damage that results in leakage.

The local logic solver 26 can be a scalable programmable ESD logic solver connected to known smart valve controllers, so that modification of known smart valve controllers for implementation as the controller 28 is not necessary. However, if desired for specific applications, such modifications can be undertaken and the modified device used in accordance with the invention.

The present invention distributes the control of each EIV 40 from a central plant-wide ESD system to each individual smart valve controller 28 configured specifically for the required safety-instrumented function associated with the respective EIV 40.

In addition, the present invention provides a local valve test diagnostic indicator, in the form of a trouble light 50 and/or other audible or visual signaling devices, at the LCP 12. The valve test diagnostic indicator 50 utilizes the data collected in an on-board memory 52 of the smart valve controller 28 during an on-line functional test. The valve test diagnostic indicator 50 compares the collected data of the on-line functional test with data collected during a previous on-line functional test stored in the memory 52, and the valve test diagnostic activates an alarm upon a predefined and significant change in data values between the tests. This difference can be programmed at a level that might go undetected by an operator. Significant changes to be compared can include an excessive travel deviation, a pneumatic systems check, or other functional parameters of the smart valve controller 28.

The trouble light 50 is mounted on the LCP 12 to be clearly visible in order to alert an operator or other personnel to a problem detected when the testing is conducted. The testing can be manually initiated or as part of an automated self-diagnostic program applied to the device. Accordingly, the operator can take corrective action immediately without the need to connect a diagnostic programmed computer to the smart valve controller 28 and take additional time analyzing test results. The use of the trouble light 50 provides a user-friendly indicator that takes advantage of the inherent diagnostic capabilities available in smart controllers known to the prior art.

In addition, the present invention provides a common platform for local valve control using the Foundation Field bus safety instrumented system (FFSIS) logic as a standardized communications protocol, as well as for valve travel monitoring, valve testing and data collection, and for diagnostic alarms and alerts.

In operation, the present invention expands the capabilities of smart valve controllers to include logic and local interface capabilities required to perform a safety instrumented function associated with an emergency isolation valve contained within the smart valve controller. The use of the present invention also reduces the complexity of the plant-wide emergency shutdown system I/O connections required for each smart valve.

The present invention provides a local indication of trouble on the smart valve 40, which is mounted in the field. Alternatively, the trouble indicator can be included in a local control panel (LCP12) at a distance from the valve 40 in a safe and convenient location. Accordingly, the operation of the overall system is simpler, in that there is no longer a need to use an external computer to diagnose the problem. In addition, technicians and operators in the field are alerted to a serious problem locally so that they can take any necessary safety precautions immediately upon noting the problem, and a specialist can be promptly notified, as required to further diagnose the problem.

As will be understood from the description, the present invention provides the flexibility of including the novel features of local logic, self-diagnosis indicator and fault timer assembled in a single housing or of using the split architecture shown in FIG. 1, where the LCP is separated from the EIV controller and the logic is placed in either the LCP or valve controller.

Figure 2:
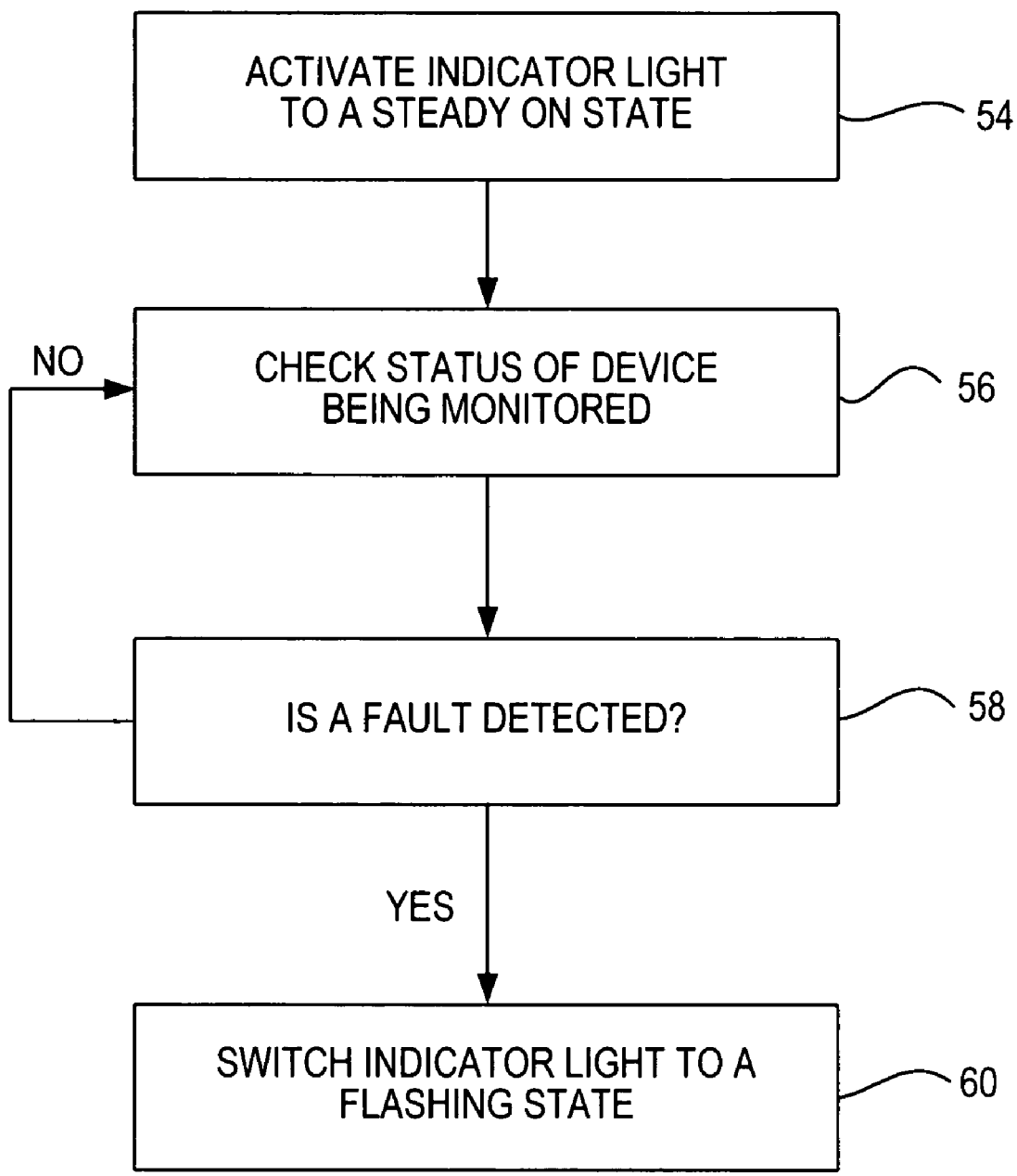
FIG. 2 illustrates a flowchart of operation of an indicator light.

In addition, as shown in FIG. 2, the present invention uses the local logic solver 26 to control the indicator light 50 which is in a steady ON state when the device 40 being monitored is performing satisfactorily, or "healthy" during normal operations, and which changes to a flashing state when a fault is detected by internal diagnostics onboard the device 40 and the smart valve controller 28. In addition, when the normally steady ON indicator light is in a steady OFF state, the illumination device operators will know that an LED, bulb or other means of illumination of the indicator light 50 has either failed or that the monitored device 40 is out of service.

The operation of the system begins by activating the indicator light 50 in step 54 to be in a steady ON state, and the status of the device being monitored is checked in step 56. If a fault is not detected in step 58, the method loops back to continue monitoring the device in step 56. However, if a fault is detected in step 58, the indicator light 50 is actuated in step 60 to be in a flashing state to indicate a fault condition in the device being monitored.

By providing either steady ON, flashing, or steady OFF states substantially adjacent to the device 40 being monitored, the condition of the device 40 can readily be determined when operators or maintenance personnel are performing routine visual checks, or simply passing by the location. An audible alarm signal can also be actuated to accompany the warning of the flashing light Accordingly, the operating state of the indicator light 50 of the present invention serves to alert operators and personnel when a particular device is operating in a seriously degraded state.

Figure 3:
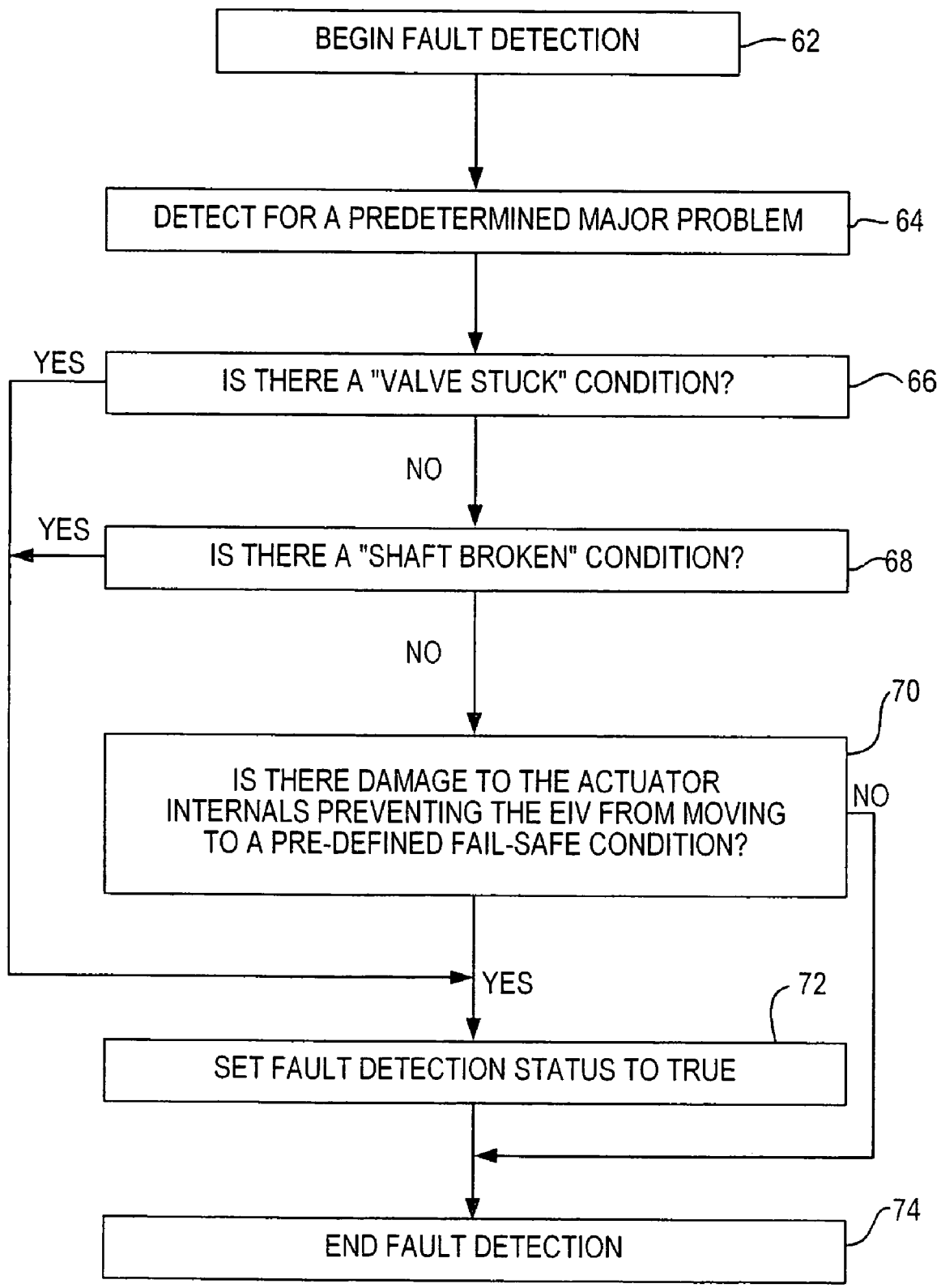
FIG. 3 illustrates a flowchart of the detection of predetermined major problems in the system.

Further, as schematically illustrated in FIG. 3, the present invention employs the local logic solver 26 to alert plant personnel to the occurrence of any of a predetermined set of major problems on EIVs installed as part of critical safety control systems. Major problems can include defects and faults which would disable an EIV and prevent it from performing its safety function, and would include a Valve Stuck condition, a Shaft Broken condition, and a condition in which damage to actuator internals of the EIV would prevent the EIV from moving to a pre-defined fail-safe state. Only when such major problems occur will a common trouble indicator light 50 be activated.

Referring to FIGS. 2-3, the step 58 of detecting a fault in FIG. 2 is performed by steps 62-74 in FIG. 3, in which the method begins fault detection in step 62, and detects for only a predetermined major problem in step 64. The method then checks if there is a Valve Stuck condition in step 66. If so, the method moves directly to step 72 to set a fault detection status to TRUE, and then ends the fault detection procedure in step 74 to proceed to step 60 in FIG. 2.

However, if no Valve Stuck condition is detected in step 66, the method determines if there is a Shaft Broken condition in step 68. If so, the method moves directly to step 72 to set a fault detection status to TRUE, and then ends the fault detection procedure in step 74 to proceed to step 60 in FIG. 2.

However, if no Shaft Broken condition is detected in step 68, the method determines in step 70 if there is any damage to the actuator internals that would prevent the EIV 40 from moving to a pre-defined fail-safe condition. If so, the method proceeds to step 72 to set a fault detection status to TRUE, and then ends the fault detection procedure in step 74 to proceed to step 60 in FIG. 2. However, if no damage is detected in step 70, the method proceeds to step 74 to end fault detection without setting the fault detection status to TRUE, and proceeds to step 60 in FIG. 2.

The present invention can be applied to other monitoring devices, such as a smart solenoid valve which monitors different types of internal failures such as a significant deviation from the expected differential pressure across valve ports, as well as the electrical coil operating temperature and current drawn.

The present invention monitors and indicates only dangerous, normally undetected failures which would disable the intended safety functions, with such monitoring and indication being provided by a local indicator to field personnel in the vicinity of the monitored device.

Figure 4:
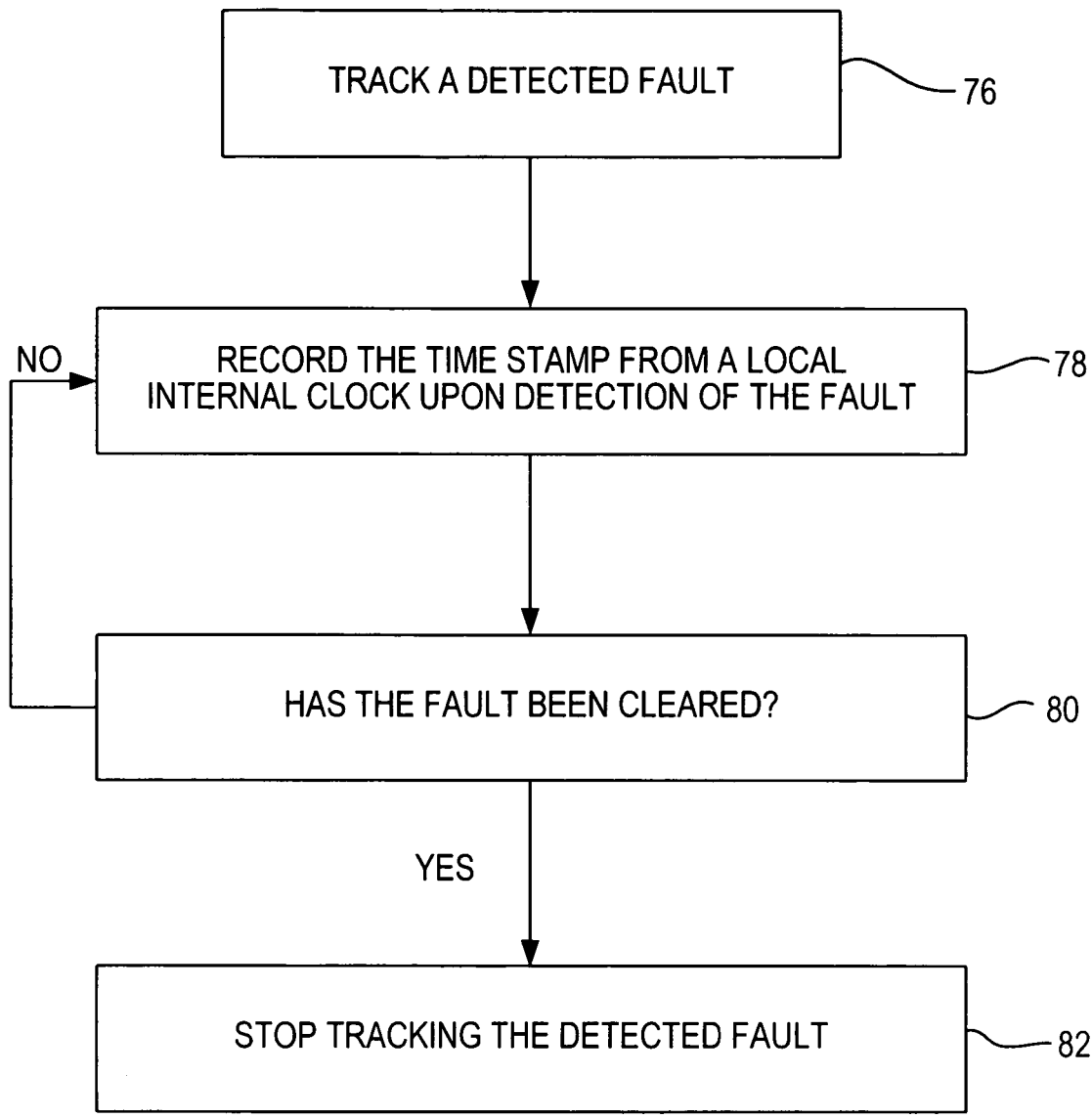
FIG. 4 illustrates a flowchart of the process for tracking detected faults.

With reference to FIG. 4, the present invention is also useful for tracking faults and for verifying safety system performance. To properly manage a plant's risk, a plant process must have its safety systems checked and maintained routinely to ensure proper functioning at the required level of performance, as prescribed in the original plant safety design guidelines. The present invention includes an enhanced fault tracking capability to provide the required documentation of system performance. When a dangerous fault in a safety device is detected, the local logic solver 26 of the present invention tracks the detected fault in step 76 and records a time-stamp in step 78 using data from internal clock 53 of the local logic solver 26 to time-stamp the detected fault.

The method then continues the program routine to determine if the fault has been cleared in step 80. If not, the method loops back to step 78, and the time-stamping will continue until the fault is cleared. When the detected fault has been cleared, the method proceeds to step 82 to stop tracking. In this mode of operation, the time that the safety device 40 was operating in a disabled state can be tracked and documented so that the impact on the overall safety instrumentation system performance can be more accurately evaluated. Furthermore, the running clock and time-stamping feature of the present invention is performed locally by the local logic solver 26.

While the preferred embodiment of the present invention has been shown and described herein, it will be understood that this embodiment is provided by way of example only. Numerous variations, changes and substitutions will occur to those skilled in the art without departing from the invention herein. Accordingly, it is intended that the spirit and scope of the invention be limited only by the claims.

I claim:

1. A system for the field monitoring of an hydraulically, pneumatically, or electrically operated emergency isolation valve (EIV) device, the system comprising:

a local smart valve controller for controlling, testing, and monitoring operation of the emergency isolation valve device;

a local logic solver substantially adjacent to the emergency isolation valve device operatively connected to the local smart valve controller to perform the testing and monitoring of the operational characteristics of the emergency isolation valve device on a continuous basis during a valve stroke test; and a local control panel including a trouble indicator light activated when a failure of the emergency isolation valve device is automatically detected by the local logic solver, the local control panel being positioned substantially adjacent to the emergency isolation valve device and operably connected to the local logic solver for responding to the testing and monitoring of the emergency isolation valve device to control the activation of the trouble indicator light viewable by personnel in the vicinity of the local control panel, wherein the local logic solver is programmed to test for a plurality of predetermined fault conditions, which include:

a valve stuck condition;

a shaft broken condition; and an actuator damage condition.

2. A system for the field monitoring of an hydraulically, pneumatically, or electrically operated emergency isolation valve (EIV) device, the system comprising:

a local smart valve controller for controlling, testing, and monitoring operation of the emergency isolation valve device;

a local logic solver substantially adjacent to the emergency isolation valve device operatively connected to the local smart valve controller to perform the testing and monitoring of the operational characteristics of the emergency isolation valve device on a continuous basis during a valve stroke test wherein the local logic device includes an internal clock; and a local control panel including a trouble indicator light activated when a failure of the emergency isolation valve device is automatically detected by the local logic solver, the local control panel being positioned substantially adjacent to the emergency isolation valve device and operably connected to the local logic solver for responding to the testing and monitoring of the emergency isolation valve device to control the activation of the trouble indicator light viewable by personnel in the vicinity of the local control panel, wherein, upon detection of a fault in either the valve device or an operatively associated actuator of the valve device, the local logic solver records time stamps continuously during the period of the fault beginning with the time of the detection of a fault condition and ending with correction of the fault.

3. A method for the field monitoring of an hydraulically, pneumatically, or electrically operated emergency isolation valve (EIV) device comprising the steps of:

managing operation of the emergency isolation valve device using a local smart valve controller;

positioning a local logic solver substantially adjacent to the emergency isolation valve device and operatively connected to the smart valve controller;

operating the local logic solver with the local smart valve controller to perform tests on the emergency isolation valve device;

operating the local logic solver with the local smart valve controller to monitor the operational characteristics of the emergency isolation valve device on a continuous basis during a valve stroke test;

positioning a local control panel having a trouble indicator light substantially adjacent to the emergency isolation valve device;

operatively connecting the local control panel to the local logic solver; and controlling the activation of the trouble indicator light in response to testing and monitoring conditions of the emergency isolation valve device, including activating the trouble indication light when a failure of the emergency isolation valve is automatically detected, wherein the activated trouble indicator light is in the field of view of personnel in the vicinity of the local control panel;

programming the local logic solver to perform tests performing the tests for a plurality of predetermined fault conditions using the programmed local logic solver, wherein the plurality of predetermined fault conditions include:

a stuck valve condition;

a broken shaft condition; and a damaged actuator condition.

4. A method for the field monitoring of an hydraulically, pneumatically, or electrically operated emergency isolation valve (EIV) device comprising the steps of:

managing operation of the emergency isolation valve device using a local smart valve controller;

positioning a local logic solver substantially adjacent to the emergency isolation valve device and operatively connected to the smart valve controller;

operating the local logic solver with the local smart valve controller to perform tests on the emergency isolation valve device;

operating the local logic solver with the local smart valve controller to monitor the operational characteristics of the emergency isolation valve device on a continuous basis during a valve stroke test;

positioning a local control panel having a trouble indicator light substantially adjacent to the emergency isolation valve device;

operatively connecting the local control panel to the local logic solver; and controlling the activation of the trouble indicator light in response to testing and monitoring conditions of the emergency isolation valve device, including activating the trouble indication light when a failure of the emergency isolation valve is automatically detected;

wherein the activated trouble indicator light is in the field of view of personnel in the vicinity of the local control panel;

testing to detect a fault in either the valve device or an actuator associated with the valve device; and upon detection of a fault in either the valve device or an actuator associated with the valve device, recording time stamps using an internal clock of the local logic device continuously during the period of the fault beginning with the time of the detection of a fault condition and ending with the time that the fault condition is corrected.

* * * * *